US012155443B2

(12) United States Patent
Nilsson et al.

(10) Patent No.: US 12,155,443 B2
(45) Date of Patent: Nov. 26, 2024

(54) INTERFACE IN SERIES-CONNECTED RADIOS

(71) Applicant: Telefonaktiebolaget LM Ericsson (publ), Stockholm (SE)

(72) Inventors: Magnus Nilsson, Lund (SE); Peter Jakobsson, Lund (SE); Jan Celander, Malmö (SE); Martin Isberg, Lund (SE); Torsten Carlsson, Lund (SE); Magnus Sandgren, Staffanstorp (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 74 days.

(21) Appl. No.: 17/921,542

(22) PCT Filed: Apr. 30, 2020

(86) PCT No.: PCT/EP2020/062042
§ 371 (c)(1),
(2) Date: Oct. 26, 2022

(87) PCT Pub. No.: WO2021/219224
PCT Pub. Date: Nov. 4, 2021

(65) Prior Publication Data
US 2023/0188193 A1    Jun. 15, 2023

(51) Int. Cl.
H04B 7/06    (2006.01)
H04B 7/024    (2017.01)
(52) U.S. Cl.
CPC ........... H04B 7/0691 (2013.01); H04B 7/024 (2013.01)
(58) Field of Classification Search
CPC .......... H04B 7/04; H04B 7/06; H04B 7/0686; H04B 7/0691; H04B 7/24; H04B 7/26;
(Continued)

(56) References Cited

U.S. PATENT DOCUMENTS 5,983,070 A * 11/1999 Georges ............... H04B 1/0003
725/71
6,810,270 B1 * 10/2004 Grohn ................. H04J 3/0647
455/560

(Continued)

FOREIGN PATENT DOCUMENTS

WO    2019053475 A1    3/2019

OTHER PUBLICATIONS

Dahlman, Erik, et al., "5G NR The Next Generation Wireless Access Technology", Academic Press, Elsevier Ltd., 2018, 1-469.

(Continued)

*Primary Examiner* — James M Perez
(74) *Attorney, Agent, or Firm* — Weisberg I.P. Law, P.A.

(57) ABSTRACT

A distributed wireless system comprises controlling node and two or more antenna processing nodes communicatively coupled to the controlling node but spatially separated from each other and from the controlling node. The controlling node sends commands to and exchanges data with a first subset of the antenna processing nodes, using a first twisted-pair lane of a physical layer interface having four twisted-pair lanes, and sends commands to and exchanging data with a second subset of the antenna processing nodes, using a second twisted-pair lane. In some embodiments, the controlling node also uses a third twisted-pair lane for communicating with the first subset, while using the fourth twisted-pair lane for communicating with the second subset. Corresponding antenna processing nodes terminate one or two twisted-pair lanes in a direction towards the controlling node, while terminating one or two twisted-pair lanes towards one or more antenna processing nodes further from the controlling node.

17 Claims, 11 Drawing Sheets

(58) Field of Classification Search
CPC .... H04B 7/2603; H04B 7/2609; H04B 7/022; H04B 7/024; H04B 7/028
See application file for complete search history.

(56) References Cited

U.S. PATENT DOCUMENTS

| | | | | |
|---|---|---|---|---|
| 6,950,414 | B1* | 9/2005 | Grohn | H04J 3/0685 370/328 |
| 9,148,203 | B2* | 9/2015 | Lemson | H04B 7/04 |
| 9,367,828 | B2* | 6/2016 | Zavadsky | H04B 7/022 |
| 9,450,653 | B2* | 9/2016 | Kummetz | H04L 27/0002 |
| 9,596,322 | B2* | 3/2017 | Uyehara | H04L 69/08 |
| 9,660,694 | B2* | 5/2017 | Eriksson | H04B 15/00 |
| 9,712,212 | B2* | 7/2017 | Treatch | H04W 24/08 |
| 9,755,868 | B2* | 9/2017 | Kummetz | H04L 27/28 |
| 9,806,818 | B2* | 10/2017 | Henry | H02J 13/00007 |
| 9,917,622 | B2* | 3/2018 | Lange | H04W 72/0453 |
| 9,954,584 | B2* | 4/2018 | Uyehara | H04L 25/03305 |
| 9,954,585 | B2* | 4/2018 | Lemson | H04B 10/25753 |
| 9,967,003 | B2* | 5/2018 | Zavadsky | H04W 88/085 |
| 10,020,850 | B2* | 7/2018 | Wala | H04B 7/26 |
| 10,027,397 | B2* | 7/2018 | Kim | H04B 7/04 |
| 10,069,541 | B2* | 9/2018 | Etkin | H04L 27/364 |
| 10,088,552 | B2* | 10/2018 | Skärby | G01S 11/06 |
| 10,164,689 | B2* | 12/2018 | Golubovic | H04B 7/022 |
| 10,264,472 | B2* | 4/2019 | Auer | H04W 16/32 |
| 10,349,289 | B2* | 7/2019 | Auer | H04W 24/02 |
| 10,355,753 | B2* | 7/2019 | Lange | H04W 72/0453 |
| 10,374,665 | B2* | 8/2019 | Zavadsky | H04B 7/04 |
| 10,404,329 | B2* | 9/2019 | Zhuang | H04B 7/024 |
| 10,484,045 | B2* | 11/2019 | Trojer | H04B 3/46 |
| 10,763,965 | B2* | 9/2020 | Ye | H04W 88/085 |
| 10,785,082 | B2* | 9/2020 | Kwon | H04L 47/24 |
| 10,797,759 | B2* | 10/2020 | Uyehara | H04B 7/024 |
| 11,005,699 | B2* | 5/2021 | Kwon | H04L 27/3405 |
| 11,032,687 | B2* | 6/2021 | Berlin | H04W 4/80 |
| 11,290,130 | B2* | 3/2022 | Liu | H03M 13/2707 |
| 11,399,281 | B2* | 7/2022 | Tsiatsis | H04W 12/30 |
| 11,570,032 | B2* | 1/2023 | Kwon | H04L 27/3405 |
| 11,570,582 | B2* | 1/2023 | El Essaili | H04W 4/40 |
| 11,641,288 | B2* | 5/2023 | Johansson | H04L 43/20 370/401 |
| 11,785,495 | B2* | 10/2023 | Zhang | H04W 28/0268 370/229 |
| 11,811,423 | B2* | 11/2023 | Liu | H03M 13/635 |
| 11,825,563 | B2* | 11/2023 | Mishra | H04W 7/024 |
| 2010/0208777 | A1* | 8/2010 | Ogaz | H04L 12/2838 375/219 |
| 2014/0072064 | A1* | 3/2014 | Lemson | H04B 7/04 375/267 |
| 2014/0146906 | A1* | 5/2014 | Zavadsky | G06Q 10/087 375/267 |
| 2014/0241224 | A1* | 8/2014 | Fischer | H04W 72/0453 370/294 |
| 2014/0243033 | A1* | 8/2014 | Wala | H04W 24/00 455/517 |
| 2015/0078471 | A1* | 3/2015 | Lemson | H04B 7/022 375/267 |
| 2015/0303999 | A1* | 10/2015 | Zhuang | H04B 7/024 370/329 |
| 2015/0341089 | A1* | 11/2015 | Kummetz | H04B 7/04 375/267 |
| 2015/0358054 | A1* | 12/2015 | Lemson | H04B 7/022 455/562.1 |
| 2015/0365501 | A1* | 12/2015 | Uyehara | H04L 25/03305 455/561 |
| 2016/0028447 | A1* | 1/2016 | Etkin | H04B 7/024 455/561 |
| 2016/0037550 | A1* | 2/2016 | Barabell | H04W 72/046 455/450 |
| 2016/0056865 | A1* | 2/2016 | Uyehara | H04B 7/024 370/329 |
| 2016/0056866 | A1* | 2/2016 | Golubovic | H04B 7/022 370/329 |
| 2016/0135184 | A1* | 5/2016 | Zavadsky | H04W 88/085 370/329 |
| 2016/0294450 | A1* | 10/2016 | Treatch | H04B 7/022 |
| 2016/0359529 | A1* | 12/2016 | Bennett | H04B 7/15507 |
| 2017/0012805 | A1* | 1/2017 | Kummetz | H04B 7/04 |
| 2017/0187429 | A1* | 6/2017 | Uyehara | H04L 69/323 |
| 2017/0257151 | A1* | 9/2017 | Lange | H04W 4/06 |
| 2018/0007562 | A1* | 1/2018 | Auer | H04W 16/32 |
| 2018/0167111 | A1* | 6/2018 | Lange | H04L 67/10 |
| 2018/0254804 | A1* | 9/2018 | Zavadsky | H04B 7/04 |
| 2018/0287696 | A1* | 10/2018 | Barbieri | H04W 36/087 |
| 2019/0097724 | A1* | 3/2019 | Ye | H04W 88/085 |
| 2019/0313227 | A1* | 10/2019 | Berlin | H04W 4/80 |
| 2020/0092154 | A1* | 3/2020 | Kwon | H04B 7/022 |
| 2020/0145060 | A1* | 5/2020 | Zhuang | H04B 7/024 |
| 2020/0259520 | A1* | 8/2020 | Crisp | G06K 7/10356 |
| 2021/0006450 | A1* | 1/2021 | Kwon | H04B 7/022 |
| 2021/0006944 | A1* | 1/2021 | Raghothaman | H04L 69/22 |
| 2021/0234746 | A1* | 7/2021 | Kwon | H04L 47/24 |
| 2021/0274405 | A1* | 9/2021 | Raghothaman | H04W 24/02 |
| 2022/0417055 | A1* | 12/2022 | Johansson | G06F 13/28 |
| 2023/0054709 | A1* | 2/2023 | Zhuang | H04B 7/024 |
| 2023/0188193 | A1* | 6/2023 | Nilsson | H04B 7/0691 375/262 |
| 2024/0195456 | A1* | 6/2024 | Zhuang | H04B 7/024 |

OTHER PUBLICATIONS

IEEE Computer Society, "IEEE Std 802.3-2018, Section 4", IEEE Standard for Ethernet, Revision of IEEE Std 802.3-2015, IEEE New York, NY, Jun. 14, 2018, 1-909.

Interdonato, Giovanni, "Signal Processing Aspects of Cell-Free Massive MIMO", Linköping Studies in Science and Technology Licentiate Thesis No. 1817, Licentiate Thesis, Linkoping University, 2018, 1-49.

Westra, Jan, et al., "A Sub-1.75W Full-Duplex 10GBASE-T Transceiver in 40nm CMOS", ISSCC 2014 / Session 8 / Optical Links and Copper PHYs / 8.5, Feb. 11, 2014, 1-3.

* cited by examiner

NOTE—
PMA_PCSDATAMODE.indication is required only for the EEE or fast retrain capabilities.
PMA_ALERTDETECT.indication and PCS_RX_LPI_STATUS.request are only required for the EEE capability.
PMA_FR_ACTIVE.indication is only required for the fast retrain capability.

| | PAM16$_1$<0> | PAM16$_1$<2> | PAM16$_2$<0> | PAM16$_2$<2> | ... | PAM16$_2$<510> |
|---|---|---|---|---|---|---|
| Pair A |
| Pair B | PAM16$_1$<1> | PAM16$_1$<3> | PAM16$_2$<1> | PAM16$_2$<3> | ... | PAM16$_2$<511> |

PMA service interface

FIG. 8

INTERFACE IN SERIES-CONNECTED RADIOS

TECHNICAL FIELD

The present disclosure generally relates to wireless systems in which a central processing unit for a base station is coupled to a series of spatially separated transmitting and receiving antenna points via serial interfaces. The present disclosure relates more particularly to an improved serial interface in such a system.

BACKGROUND

The term "cell-free massive MIMO" has been used to refer to a massive Multiple-Input Multiple-Output (MIMO) system where some or all of the transmitting and receiving antennas for a base station are geographically distributed, apart from the base station. Each of the transmitting and receiving points may be referred to as an "antenna point," "antenna processing node," or "antenna processing unit." These terms may be understood to be interchangeable for the purposes of the present disclosure, with the abbreviation "APU" being used herein. These APUs are communicatively coupled to and controlled by a controlling node, which is spatially separate from some or all of the APUs, may be referred to interchangeably as a "central processing node" or "central processing unit"—the abbreviation "CPU" is used herein. The interconnections between the APUs and the CPU may be referred to as a "fronthaul" network, while the CPU's connection to a broader network may be regarded as the "backhaul."

FIG. 1 provides a conceptual view of a cell-free massive MIMO deployment, comprising a CPU 20 connected to several APUs 22, via serial links 10. As seen in the figure, each of several user equipments (UEs) 115 may be surrounded by one or several serving APUs 22, all of which may be attached to the same CPU 20, which is responsible for processing the data received from and transmitted by each APU. Each UE 115 may thus move around within this system without experiencing cell boundaries.

Systems described herein include at least CPU and two or more APUs spatially separated from each other and from the CPU. These systems, which may be considered examples of cell-free massive MIMO deployments, will be called distributed wireless systems herein. FIGS. 2 and 3 provide other views of example deployments of distributed wireless systems. In this scenario shown in FIG. 2, multiple APUs 22 are deployed around the perimeter of a room, which might be a manufacturing floor or a conference room, for example. Each APU 22 is connected to the CPU 20 via a "strip," or "stripe." These might also be referred to as "chains" or "branches." More particularly, the CPU 20 in this example deployment is connected to two such stripes, each stripe comprising a serial concatenation of several (10, in the illustrated example) APUs 22. FIG. 3 shows an two-dimensional model of a factory floor with densely populated APUs 22 connected to the CPU 20 via several such "stripes." As a general matter, the CPU 20 can target a UE anywhere in the room by controlling one or several APUs 22 that are closest to the UE to transmit signals to and receive signals from the UE. In this example deployment, the APUs are spaced at 10 meters, in both x- and y-directions, which means that a UE is never more than about 7 meters away from one (or several) APUs, in the horizontal dimension.

It will be appreciated that the distribution of base station antennas into APUs as shown in FIGS. 1-3 can provide for shorter distances between the base station antennas and the antenna(s) for any given UE served by the base station, in many scenarios. This will be an enabler for the use of higher carrier frequencies, and thereby higher modulation/information bandwidths, both of which are key expectations for fifth generation (5G) wireless networks.

Another requirement of 5G networks is that they support a high quality-of-service (QoS). To achieve this, it is necessary that the radio link between the mobile/device/machine (UE) and the base station be highly reliable and support low-latency communications. This is especially the case for industrial scenarios, for example, where mission-critical real-time communication is needed for communications with or between machines equipped with devices. These communications and the supporting technologies are referred to as ultra-reliable low-latency communications (URLLC). It will be appreciated that distributed wireless systems like those shown in FIGS. 1-3 and described above are good candidates for ultra-reliable networking, since these deployments provide for multiple possible radio links between a given UE and the infrastructure network.

SUMMARY

Because the APUs in the distributed wireless systems shown in FIGS. 2 and 3 are connected to each other and to the CPU through a series of serial links, the serial interfaces in all of the APUs must generally be operating, even if only one or a few APUs are actively transmitting and/or receiving at a given time. Assuming the interface is Ethernet and POE (power over ethernet), inactive APUs will limit the system's power budget even when not involved in the active transmission. This will tend to limit the maximum number of APUs that may be connected. Also, the maximum number of simultaneously active APUs than can be supported will be limited. Another potential problem with series-connected APUs as shown in FIGS. 2 and 3 is that the system may be vulnerable to single points of failure. If one APU breaks, the link to all subsequent APUs is also lost. Embodiments of the techniques described herein address these problems by providing a modified version of the well-known Ethernet serial interface.

A distributed wireless system according to several of the presently disclosed embodiments comprises a controlling node and two or more antenna processing nodes communicatively coupled to the controlling node but spatially separated from each other and from the controlling node. The controlling node sends commands to and exchanges data with a first subset of the antenna processing nodes, using a first twisted-pair lane of a physical layer interface having four twisted-pair lanes, and sends commands to and exchanging data with a second subset of the antenna processing nodes, using a second twisted-pair lane. In some embodiments, the controlling node also uses a third twisted-pair lane for communicating with the first subset, while using the fourth twisted-pair lane for communicating with the second subset. Corresponding antenna processing nodes terminate one or two twisted-pair lanes in a direction towards the controlling node, while terminating one or two twisted-pair lanes towards one or more antenna processing nodes further from the controlling node.

An example method according to some of the embodiments detailed below is carried out in a controlling node of a distributed wireless system that comprises the controlling node and two or more antenna processing nodes communicatively coupled to the controlling node but spatially separated from each other and from the controlling node. This example method comprises sending commands to and exchanging data with a first subset of the antenna processing nodes, using a first twisted-pair lane of a physical layer interface having four twisted-pair lanes. This example method further comprises sending commands to and exchanging data with a second subset of the antenna processing nodes, using a second twisted-pair lane of the physical layer interface.

In some embodiments, the method further comprises sending commands to and exchanging data with a third subset of the antenna processing nodes, using a third twisted-pair lane of the physical layer interface, and sending commands to and exchanging data with a fourth subset of the antenna processing nodes, using a fourth twisted-pair lane of the physical layer interface. In these embodiments, then, each subset of antenna processing nodes is served using only a single twisted-pair lane. In other embodiments, the sending commands to and exchanging data with the first subset of the antenna processing nodes comprises using the first twisted-pair lane as well as a third twisted-pair lane of the physical layer interface, and the sending commands to and exchanging data with the second subset of the antenna processing nodes comprises using the second twisted-pair lane as well as a fourth twisted-pair lane of the physical layer interface. In these embodiments, each subset of antenna processing nodes is served using two of the twisted-pair lanes.

Another example method according to some of the embodiments detailed below is carried out in a first antenna processing node of a distributed wireless system comprises a controlling node, the first antenna processing node, and one or more additional antenna processing nodes, each of the antenna processing nodes being communicatively coupled to the controlling node but spatially separated from each other and from the controlling node. This example method comprises receiving commands from and exchanging data with the controlling node, using a first twisted-pair lane of a physical layer interface having four twisted-pair lanes, and forwarding commands and data to and receiving data from one or more other ones of the antenna processing nodes, using a second twisted-pair lane of the physical layer interface. In some embodiments, the method further comprises receiving commands from and exchanging data with the controlling node using a third twisted-pair lane of the physical layer interface as well as the first twisted-pair lane, and further comprises forwarding commands and data to and receiving data from one or more other ones of the antenna processing nodes using a fourth twisted-pair lane of the physical layer interface as well as the second twisted-pair lane.

Details and variants of the methods and apparatuses summarized above are described in the detailed description below, and illustrated in the attached figures.

BRIEF DESCRIPTION OF THE FIGURES

FIG. 8 illustrates a modified mapping, according to some embodiments.

DETAILED DESCRIPTION

There are several possible approaches for implementing the interconnections between the CPU in a distributed wireless system and the APUs that it controls. One approach is to implement the interconnections between the CPUs and the APUs as a high-speed digital interface, e.g., such as a high-speed Ethernet connection, which might be a power-over-Ethernet (POE) connection. With this approach, information to be transmitted by a given APUs is sent from the CPU to the APU as digital baseband information. This digital baseband information is then up-converted to a radiofrequency (RF) signal in the APU, for transmission over the air. In the other direction, RF signals received from a UE are down converted in the APU and converted to digital form before being sent over the digital link to the CPU, for further processing.

Figure 4:
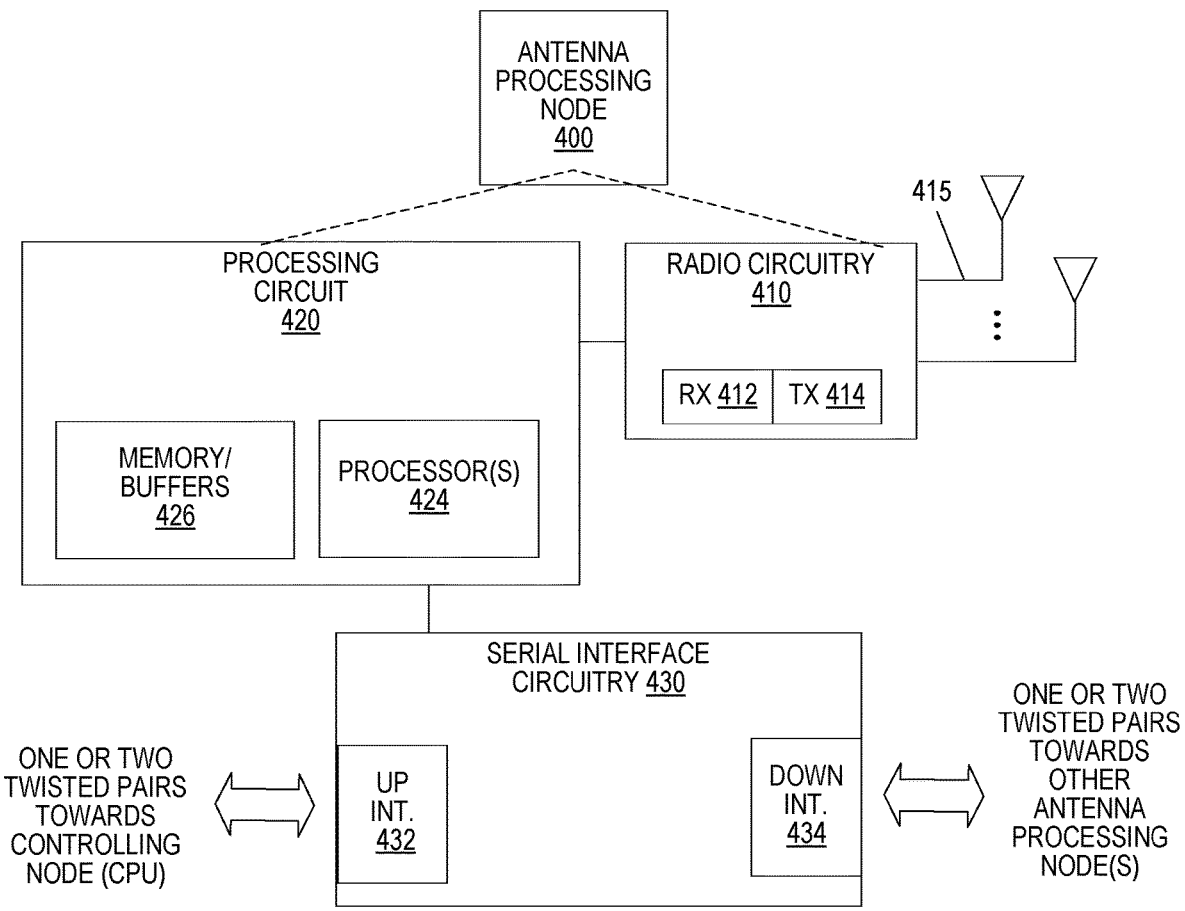
FIG. 4 is a block diagram of an example antenna processing node, according to some embodiments.

The techniques described herein are focused the approach described above, i.e., on systems where a CPU is connected to multiple APUs via a series of serial links. In such a system, communications along these serial links may be described as "upstream" and "downstream" communications, where upstream communications are communications in the direction towards the CPU while downstream communications are in the opposite direction, i.e., away from the CPU. In the upstream direction, each APU thus sends its own data towards the CPU, via an upstream serial interface, along with any data that it receives from one or more APUs that are further downstream, via a downstream serial interface. This is seen in FIG. 4, which is a block diagram illustrating components of an example APU, here illustrated as antenna processing node 400. As seen in the figure, the antenna processing unit 400 also receives communications for itself and for downstream APUs from the CPU, via the upstream serial interface 432, and forwards those communications intended for downstream APUs towards those APUs, via the downstream serial interface 434. Likewise, the antenna process unit 400 sends data that it receives from one or more UEs to the CPU via the upstream serial interface 432, while also receiving similar data from other APUs via the downstream serial interface 434, which it then forwards to the CPU via the upstream serial interface 432.

The required capacity of the fronthaul network formed by these serial links is proportional to the number of simultaneous data streams that the APUs in the series can spatially multiplex, at maximum network load. The required capacity of the backhaul of the CPU (i.e., the CPUs connection towards the core network) is the sum of the data streams that the serial links connecting the APUs to the CPUs will transmit and receive at maximum network node. The most straightforward way to limit these capacity requirements is to constrain the number the number of UEs that can be served per APU and CPU. Put another way, the capacity of the distributed wireless system to serve UEs may be limited by the maximum capacities of the serial links between the APUs to the CPUs.

The use of serial interfaces as described above is generally a good match for downlink (DL) communications, i.e., communications from a base station to one or more UEs. Note that the terms "wireless device," "user equipment," and "UEs" are used herein to refer to any wireless devices served by the distributed wireless systems described here, including wireless devices that do not have a "user" as such but that are connected to machines. The serial interfaces described here work well for downlink communications because the same information may be sent to all of the APUs involved in any given transmission to a wireless device. This downlink information may be the bits or data blocks that must be transmitted by the APUs, with each APU involved in the transmission separately performing its own coding, modulation, upconversion, and transmission. There are other possibilities, however, such as the CPU sending to the APUs a time-domain digital representation of a modulated in-phase/quadrature (I/Q) signal, for upconversion and transmission, or the CPU sending to the APUs a frequency-domain digital representation of I/Q symbols, for OFDMA modulation, upconversion, and transmission by the APUs. In any of these cases, when the CPU sends this downlink information to two or more APUs in the chain, it need only send one copy, with each APU forwarding the information further downstream, as necessary.

Figure 1:
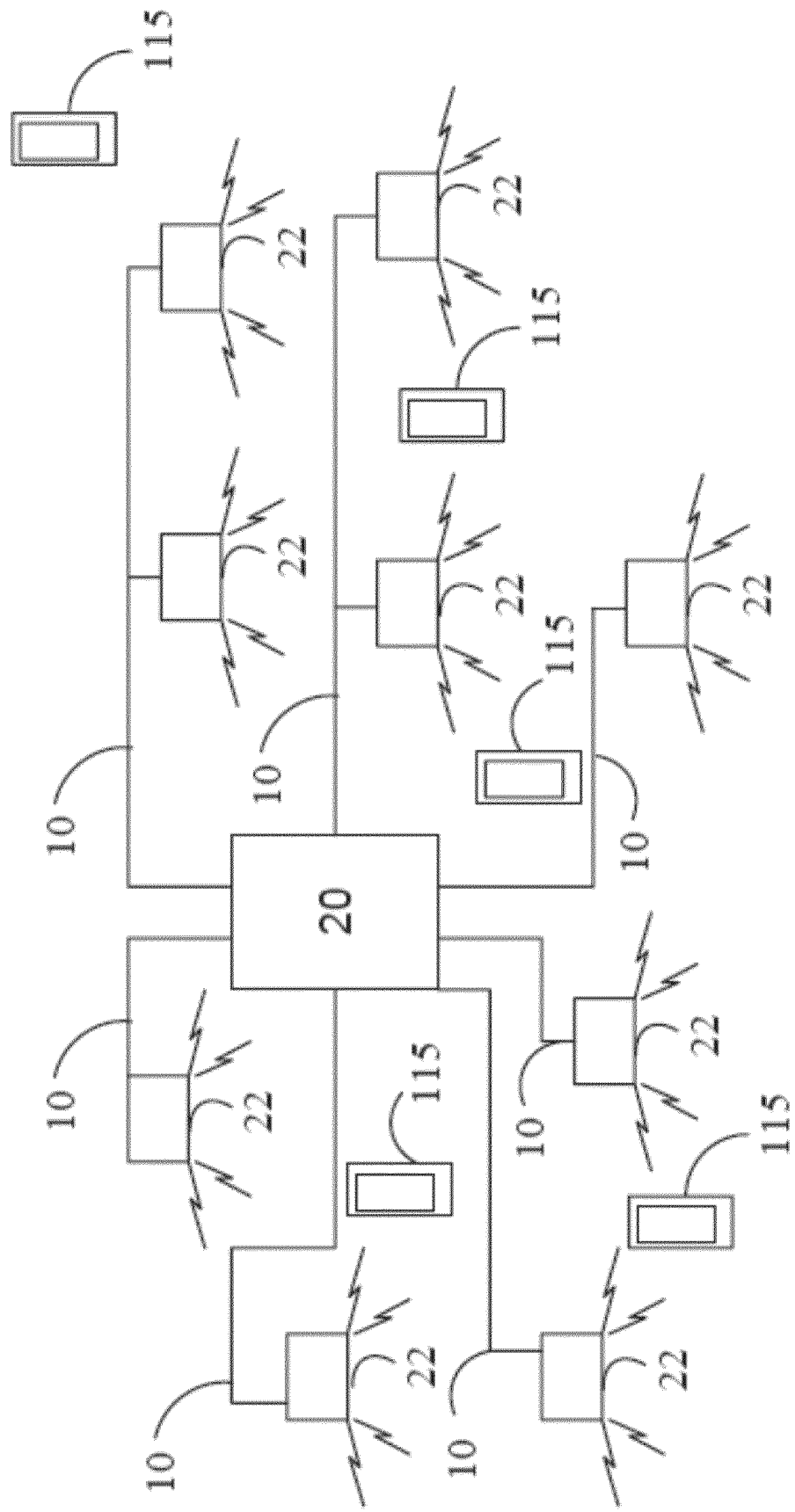
FIG. 1 is an illustration of an example cell-free massive MIMO system.
Figure 2:
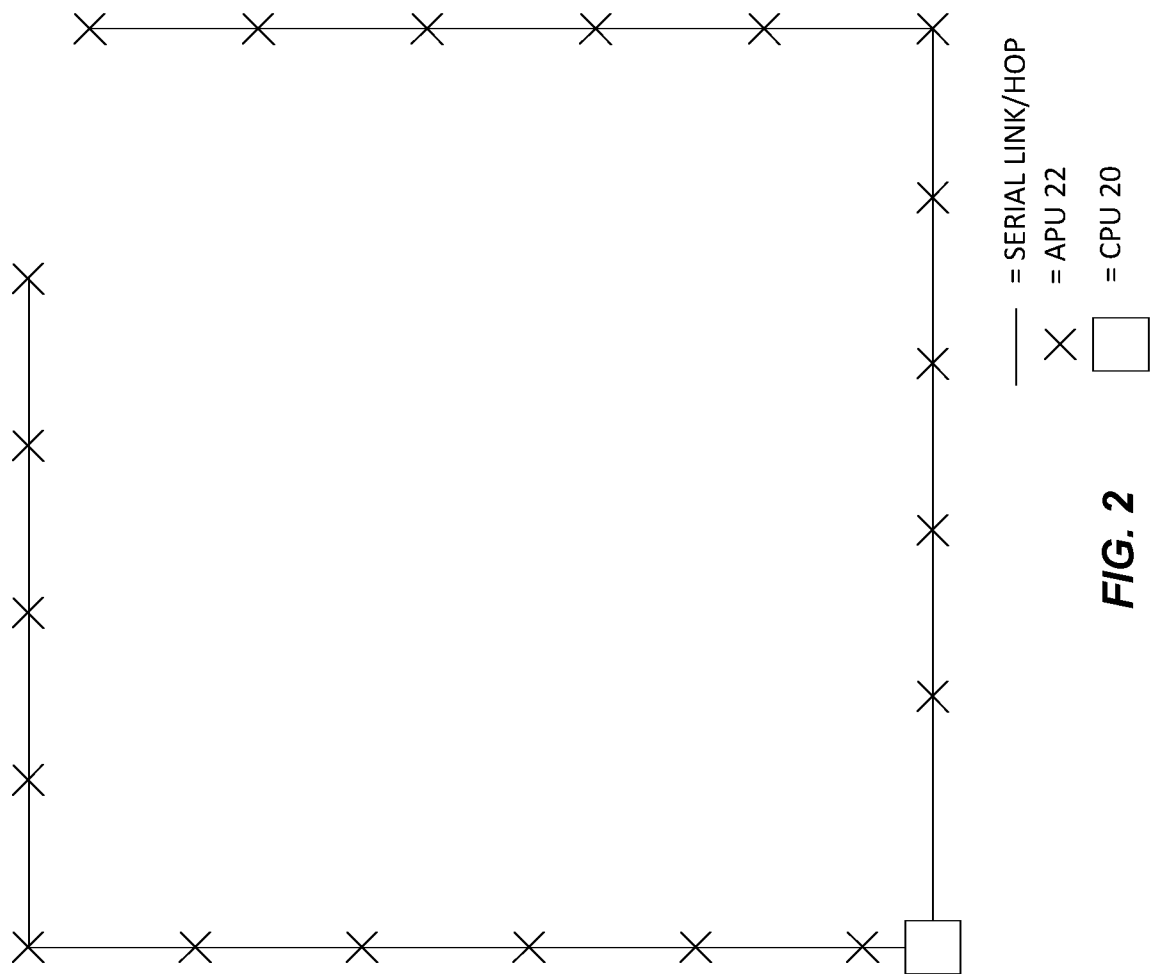
FIG. 2 illustrates an example deployment of a distributed wireless system.
Figure 3:
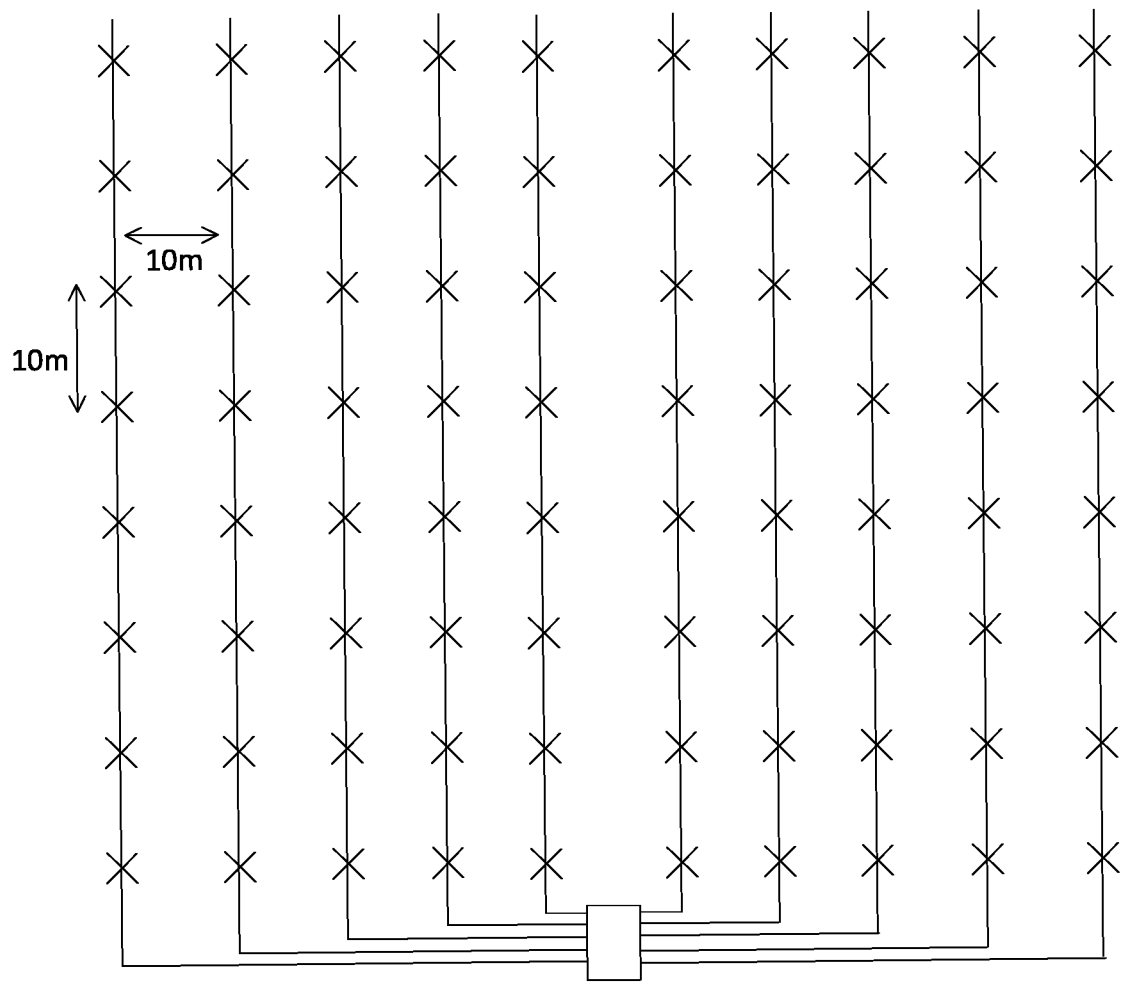
FIG. 3 illustrates another example deployment of a distributed wireless system.

Because the APUs in the distributed wireless systems shown in FIGS. 2 and 3 are connected to each other and to the CPU through a series of serial links, the serial interfaces in all of the APUs must generally be operating, even if only one or a few APUs are actively transmitting and/or receiving at a given time. Assuming the interface is Ethernet and POE (power over ethernet), inactive APUs will limit the system's power budget even when not involved in the active transmission. This will tend to limit the maximum number of APUs that may be connected. Also, the maximum number of simultaneously active APUs than can be supported will be limited. Another potential problem with series-connected APUs as shown in FIGS. 2 and 3 is that the system may be vulnerable to single points of failure. If one APU breaks, the link to all subsequent APUs is also lost. Embodiments of the techniques described herein address these problems by providing a modified version of the well-known Ethernet serial interface.

High-speed Ethernet comprises Ethernet variants known as 1000BASE-T, 2.5GBASE-T, 5GBASE-T, 10GBASE-T, and 25GBASE-T, providing maximum raw data rates of 1, 2.5, 5, 10, and 25 Gbit/second, respectively. These variants are specific versions of what are known as Gigabit Ethernet, 2.5 Gigabit Ethernet, 5 Gigabit Ethernet, 10 Gigabit Ethernet, and 25 Gigabit Ethernet, respectively, typically utilize 8-conductor twisted-pair cabling, such as Cat 5e, Cat 6, Cat 6A, Cat 7, or Cat 8 cabling, which provide for four twisted-pair (TP) lanes. Each of these lanes carries one-fourth of the full duplex data carried by the cable. Details of Ethernet are defined in "IEEE Standard for Ethernet," in IEEE Std 802.3-2018 (Revision of IEEE Std 802.3-2015), vol., no., pp. 1-5600, 31 Aug. 2018; Clause 55, which defines the Physical Coding Sublayer (PCS), Physical Medium Attachment (PMA) sublayer, and baseband medium for type 10GBASE-T Ethernet is of particular relevance for 10 Gbit (and higher) data rate applications. This standard is referred to hereinafter as simply "the Ethernet Standard."

In a distributed wireless system using a simple series configuration, e.g., as shown in FIGS. 2 and 3, each APU has two Ethernet connections, managed by respective Ethernet interface circuits, which may be referred to as Ethernet interfaces, or simply interfaces. These are shown in FIG. 4 as upstream interface 432, which receives data from and transmits data towards the CPU, and downstream interface 434, which receives data from and transmits data towards APUs further away from the CPU. Each APU can be in either idle or active mode. In idle mode, an APU is only forwarding data to subsequent series connected devices and monitoring the Ethernet packages for requests (from the CPU) to change the APU's state to active mode. In active mode, the APU is either transmitting or receiving data from the UE, with that data being received from or forwarded to the CPU, respectively.

The capacity of each connection/interface is dimensioned to handle the sum data traffic of all active APUs. Since the data rates to support 5G communications may be very high, the power consumption of the APUs in idle mode may be quite high, e.g., on the order of several Watts, with this idle-mode power consumption being dominated by the analog drivers connected to the Ethernet cables. An example Ethernet physical layer for a 10 Gbit Ethernet is described in J. R. Westra et al., "8.5 A sub-1.75 W full-duplex 10GBASE-T transceiver in 40 nm CMOS," 2014 *IEEE International Solid-State Circuits Conference Digest of Technical Papers (ISSCC)*, San Francisco, CA, 2014, pp. 146-147.

Figure 5:
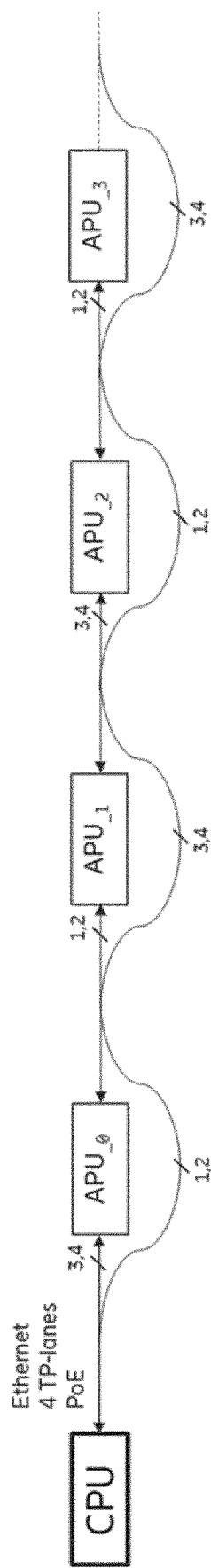
FIG. 5 illustrates an example deployment of a distributed wireless system modified according to some of the techniques described herein.

According to several of the embodiments described herein, rather than terminating all four lanes of the Ethernet cabling at each of the APU's serial interfaces, each interface terminates only one or two of the four lanes. The other two or three lanes bypass the APU, for termination at a succeeding downstream APU, in the downstream direction, or at a succeeding upstream APU or the CPU, in the upstream direction. FIG. 5 illustrates an example where two of the four Ethernet lanes are terminated at each interface, with each APU in the chain terminating the two lanes other that bypassed the preceding and/or succeeding APU. Thus, the first downstream APU in the illustrated system, labeled APU_0, terminates lanes 3 and 4 at its upstream serial interface, in this example, while lanes 1 and 2 bypass APU_0 and are terminated at APU_1. Likewise, lanes 3 and 4, which are terminated at the downstream interface of APU_0, bypass APU_1 and are terminated at the upstream interface of APU_2. This pattern is continued for APU_3 and any subsequent APUs in the chain. It will be appreciated that in an embodiment where only one lane is terminated at each of the downstream and upstream interfaces, every fourth APU will be connected to the same lane, and each lane will bypass three APUs between terminations.

A consequence of this, of course, is that the data rate supplied to a given APU is only one-half or one-fourth of the total capacity of the Ethernet cabling. At the same time, however, a given lane is serving only one-half or one-fourth of all the APUs in a chain, so both the aggregate data capacity and average per-APU capacities of the serial links are unchanged. If the aggregate data rate that can be sourced or terminated by the CPU is 10 Gbits/second, for example, then 5 Gbits/second can be supplied to or received from any of the APUs in the system shown in FIG. 5, which will support high data transmission and reception rates by a single APU or by several APUs operating simultaneously.

A key benefit of the approach discussed above, as exemplified by the two-lane embodiment shown in FIG. 5, is that each APU only needs to drive one-half or one-fourth of the TP lanes, compared to a scenario in which each APU interface terminated all four TP lanes supported by the Ethernet cable. This can reduce APU power consumption in idle mode by as much as 30-60%. Another benefit of the approach is that the overall system is more robust, in that single points of failure will cause degradation in system performance, but not total failure of large portions of the system. If one of the APUs in the system shown in FIG. 4 fails, for example, then only one-half of the APUs further downstream from that APU are affected. The remainder will remain functional and available for communications. This improved system robustness also provides for enhanced upgradeability of the system. One-half or one-fourth of the APUs may be taken out of operation and upgraded, using the lane or lanes that connect them to the CPU, while the remaining APUs continue to operate normally.

As discussed above, in the system illustrated in FIG. 5, each APU is connected to only two TP lanes, in each direction (upstream and downstream). Physical connections to these upstream and downstream interfaces, which utilize only four wires each, can be made with a single 8-pin connector, e.g., a single RJ45 or 8P8C connector. Thus, for example, each APU may house only a single RJ45 or 8P8C jack, with four of the pins corresponding to the two lanes of the APU's upstream serial interface and the remaining four pins corresponding to the two lanes of the APU's downstream serial interface. In embodiments where only one lane is terminated at each APU interface, a single RJ45 or 8P8C connector might also be used, but in this case only four of the eight pins will be utilized.

The techniques described above may be applied to any of the Ethernet versions that utilize four TP lanes. As noted above, these include several standard versions, providing several rates and medium. For the distributed wireless systems described here, appropriate standard versions might include 2.5GBASE-T, 5GBASE-T and 10GBASE-T, although the techniques described herein are not limited to those specific versions. Each of these versions provides full duplex connections using copper-based TP-cables. The protocols for each are similar, with only the actual data/symbol rates differing. Actual data rates for these versions are 2.5, 5 and 10 Gbit/second, respectively.

Normally the data sent over the Ethernet cable when using these versions of the standard is spread evenly across all four lanes in the TP cable. To implement the techniques described above, a small deviation from the standards is necessary.

Figure 6:
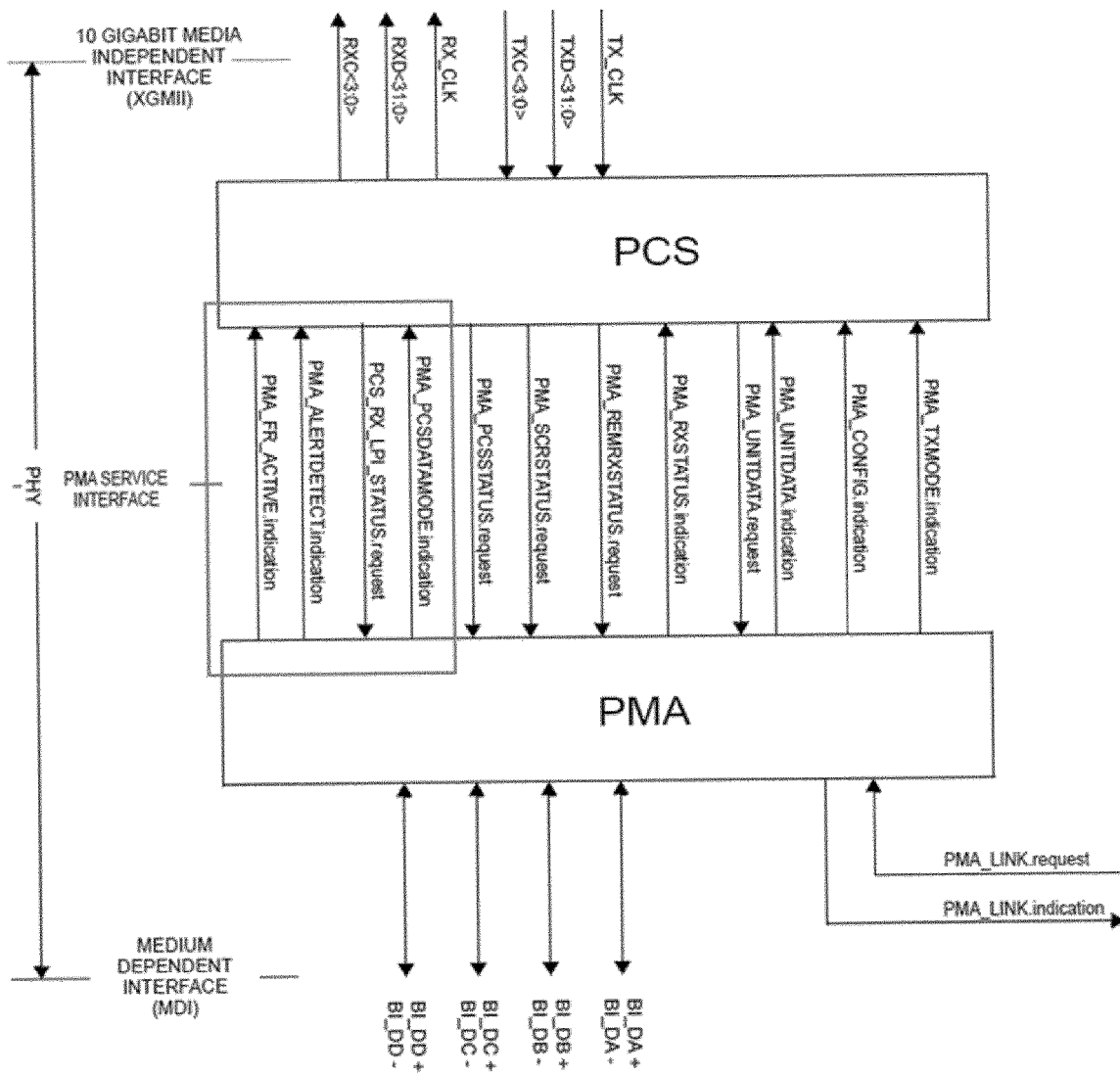
FIG. 6 illustrates the physical layer (PHY) according to the Ethernet standard.
Figure 7:
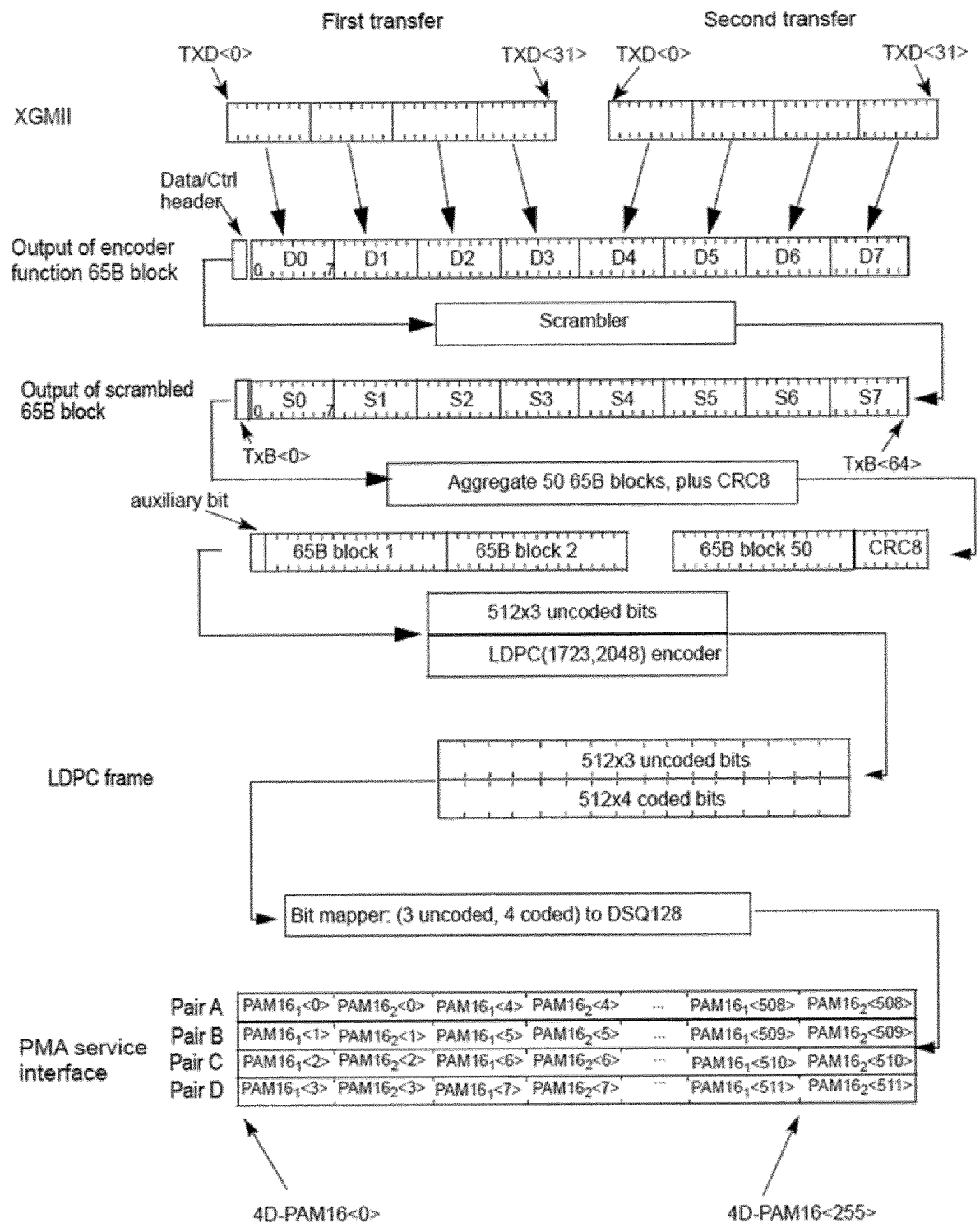
FIG. 7 illustrates bit mapping to four lanes, according to the Ethernet standard.

More particularly, FIG. 6 shows the layer and signal flow inside the physical layer (PHY) in 10GBASE-T. This figure is reproduced from FIG. 55-4 of the Ethernet standard. As seen in the figure, the Physical Medium Attachment (PMA) block is responsible for mapping the data onto the TP lanes. The details of the PCS and PMA block operation, as defined by the Ethernet standard, are shown in FIG. 7, which is reproduced from FIG. 55-6 of the Ethernet standard. As seen there, data blocks for transfer are encoded, scrambled, and aggregated, and a low-density parity-check (LDPC) code added, to form an LDPC frame. Bits from the LDPC frame are then transmitted down the four TP lanes using a double-square 128 (DSQ128) constellation. Here, pulse-amplitude modulation-16 (PAM-16) signaling is used, two symbols at a time, with 7 bits (3 uncoded and 4 uncoded) mapped to these two symbols. The DSQ128 constellation is a constellation that uses only 128 of the possible 256 two-symbols, to increase the space between symbols.

As seen in FIG. 7, the mapping of the symbols to the lanes in the 10GBASE-T Ethernet standard map successive PAM-16 symbols to different lanes. Thus, $PAM16_1<0>$ is mapped to Pair A (lane 1), $PAM16_1<1>$ is mapped to Pair B (lane 2), $PAM16_1<2>$ is mapped to Pair C, and $PAM16_1<3>$ is mapped to Pair D. This is repeated for $PAM16_2<0>$-$PAM16_2<3>$, and so on. A consequence of this is that data in a given data block fed into the PCS block is spread across all four lanes. If only two lanes are terminated at a given APU, this means that half of the data in a given transport block would not reach that APU.

This is addressed by redefining the mapping performed by the PMA block onto the TP lanes. FIG. 8 shows how this is done for a system like that shown in FIG. 5, where each APU terminates two lanes. Here, $PAM16_1<0>$ is mapped to Pair A (lane 1) and $PAM16_1<1>$ is mapped to Pair B (lane 2), just as in the standard case. However, $PAM16_1<2>$ is mapped to Pair A, and $PAM16_1<3>$ is mapped to Pair B, which means that all the data from a given transport block is mapped to only two of the four lanes. Similar mapping can be performed separately for Pair C and Pair D, for data targeted to APUs targeting the other two lanes. Of course, in a system in which each APU terminates only a single lane, the PMA mapping is further modified so that data targeted to a given APU is mapped to a single TP lane. The PCS and PMA blocks are considered part of the physical (PHY) layer, which resides below the Ethernet data link so these modifications may be understood as modifying the existing standards for the existing Gigabit Ethernet PHY layer, 10 Gigabit Ethernet PHY later, etc., to obtain a modified Gigabit Ethernet PHY layer, while maintaining compatibility with an unmodified data link layer running at one-half or one-fourth its normal speed.

It will be appreciated that the techniques described above may be used to provide the advantages of reduced power consumption, for a given system data capacity, and improved system robustness. In specific embodiments utilizing the 10GBASE-T and similar variants of the Ethernet standard, these techniques may be implemented with minor changes to the physical (PHY) layer portion of the standard. The general techniques, whereby each APU in a distributed wireless system terminates only a subset of the lanes carried by a multi-lane data cable, are more generally applicable, of course.

Figure 9:
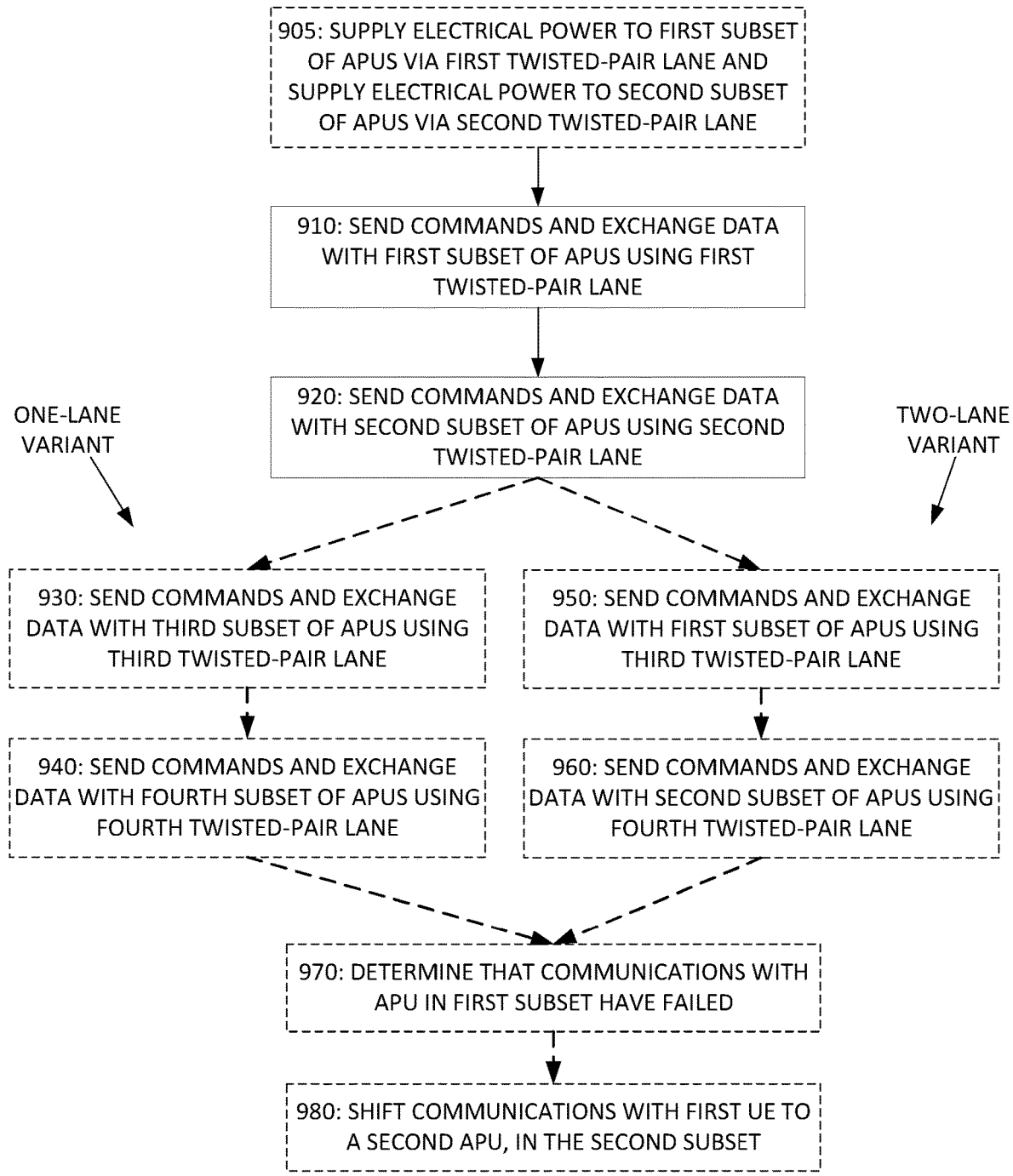
FIG. 9 is a process flow diagram of an example method carried out by a controlling node, according to some embodiments.

Given the specific details and examples presented above, it will be appreciated that FIG. 9 is a process flow diagram illustrating an example method according to some of the techniques described herein, as carried out by a controlling node or CPU. The controlling node performing this method is in a distributed wireless system that comprises the controlling node and two or more antenna processing nodes communicatively coupled to the controlling node but spatially separated from each other and from the controlling node, e.g., as shown in FIG. 2 or 3.

As shown at block 910, the method comprises the step of sending commands to and exchanging data with a first subset of the antenna processing nodes, using a first twisted-pair lane of a physical layer interface having four twisted-pair lanes. As shown at block 920, the method further comprises sending commands to and exchanging data with a second subset of the antenna processing nodes, using a second twisted-pair lane of the physical layer interface. It will be appreciated that these steps may be performed at the same time, or in overlapping intervals, as the communications with the first and second subsets of antenna processing nodes may be independent, except for using parts of the same four TP-lane physical interface. Note that here and elsewhere in this document, the terms "first," "second," "third," etc., are used nominally, i.e., merely to distinguish one instance of a thing from another, rather than ordinally, and thus should not be understood to imply a particular order unless the context demands otherwise.

In some embodiments, as was discussed earlier, each of the antenna processing nodes may terminate only a single lane. In these embodiments, the method may then further comprise sending commands to and exchanging data with a third subset of the antenna processing nodes, using a third twisted-pair lane of the physical layer interface, and sending commands to and exchanging data with a fourth subset of the antenna processing nodes, using a fourth twisted-pair lane of the physical layer interface. These steps are shown in blocks 930 and 940, which are shown as the "one-lane variant" in FIG. 9. In some of these embodiments sending commands to and exchanging data with the first subset of the antenna processing nodes comprises using a first Gigabit Ethernet or 10 Gigabit Ethernet data link layer and using a modified Gigabit Ethernet or 10 Gigabit Ethernet physical layer to map data processed by the first Gigabit Ethernet or 10 Gigabit Ethernet data link layer to and from only the first twisted-pair lane. Similarly, sending commands to and exchanging data with the second subset of the antenna processing nodes comprises using a second Gigabit Ethernet or 10 Gigabit Ethernet data link layer and using the modified Gigabit Ethernet or 10 Gigabit Ethernet physical layer to map data processed by the second Gigabit Ethernet or 10 Gigabit Ethernet data link layer to and from only the second twisted-pair lane. This can be extended to the third and fourth subsets, using the third and fourth twisted-pair lanes and third and fourth Gigabit data link layers.

In other embodiments, each of the antenna processing nodes may terminate only two of the four lanes. In these embodiments, sending commands to and exchanging data with the first subset of the antenna processing nodes may comprise using the first twisted-pair lane and a third twisted-pair lane of the physical layer interface, and sending commands to and exchanging data with the second subset of the antenna processing nodes comprises using the second twisted-pair lane and a fourth twisted-pair lane of the physical layer interface. The use of the third and fourth twisted-pair lanes in this variant is shown at blocks 950 and 960, which are shown as the "two-lane variant" in the Figure. In some embodiments of this two-lane variant, the first subset may comprise every second one of the antenna processing nodes, as ordered along cabling connecting the controlling node to the antenna processing nodes, while the second subset comprises the remaining ones of the antenna processing nodes.

In some embodiments of the two-lane variant, sending commands to and exchanging data with the first subset of the antenna processing nodes comprises using a first Gigabit Ethernet or 10 Gigabit Ethernet data link layer and using a first modified Gigabit Ethernet or 10 Gigabit Ethernet physical layer to map data processed by the first Gigabit Ethernet or 10 Gigabit Ethernet data link layer to and from only the first and third twisted-pair lanes. Similarly, sending commands to and exchanging data with the second subset of the antenna processing nodes may comprise using a second Gigabit Ethernet or 10 Gigabit Ethernet data link layer and using a second modified Gigabit Ethernet or 10 Gigabit Ethernet physical layer to map data processed by the second Gigabit Ethernet or 10 Gigabit Ethernet data link layer to and from only the third and fourth twisted-pair lanes.

With either of the variants described above, sending commands to and exchanging data with the first subset of the antenna processing nodes and said sending commands to and exchanging data with the second subset of the antenna processing nodes may be performed via a single 8P8C or RJ45 connector interface, in some embodiments.

As was noted in the above discussion, one advantage of the techniques described herein is that robustness of the system with respect to antenna process node failures is improved. Thus, in some embodiments or instances of the method shown in FIG. 9, the method carried out by the controlling node may comprise determining that communications with a first antenna processing node have failed, the first antenna processing node being in the first subset and having been used by the controlling node to communicate with a first user equipment. This is shown at block 970. The method may further comprise, in response to this determination, shifting communications with the first user equipment to at least a second antenna processing node, in the second subset. In other words, commands and/or data previously sent to the first antenna processing node, e.g., for communication with one or more UEs served by that antenna processing node, are now sent to another antenna processing node. Because one or more other antenna processing node in the first subset may now be unavailable, because of the failure of the antenna processing node in the first subset, these commands and/or data are now sent to an antenna processing node in the second subset. Because those antenna processing nodes in the second subset are connected to the controlling node through one or two TP lanes that are separate from those connecting the failed antenna processing node, all of the antenna processing nodes in the second subset should still be in operation.

Power over Ethernet (POE) was also mentioned above. This allows the DC electrical power for operating a device to be supplied over the Ethernet cable, eliminating the need for batteries or other power supplies at each of the antenna processing nodes. The POE concept may still be used in embodiments of the presently disclosed systems, but must be modified so that DC power is supplied separately to each of the subsets of antenna processing nodes, since they are connected to the controlling node through separate subsets of the TP lanes. Thus, in some embodiments of the method disclosed in FIG. 9, the method further comprises supplying electrical power to the first subset of antenna processing nodes via at least one conductor of the first twisted-pair lane and supplying electrical power to the second subset of antenna processing nodes via at least one conductor of the second twisted-pair lane. This is shown at block 905. Note that in the one-lane variant, electrical power would in these embodiments also be sent to the third subset of antenna processing nodes via at least one conductor of the third twisted-pair lane and to the fourth set of antenna processing nodes via at least one conductor of the fourth twisted-pair lane.

Figure 10:
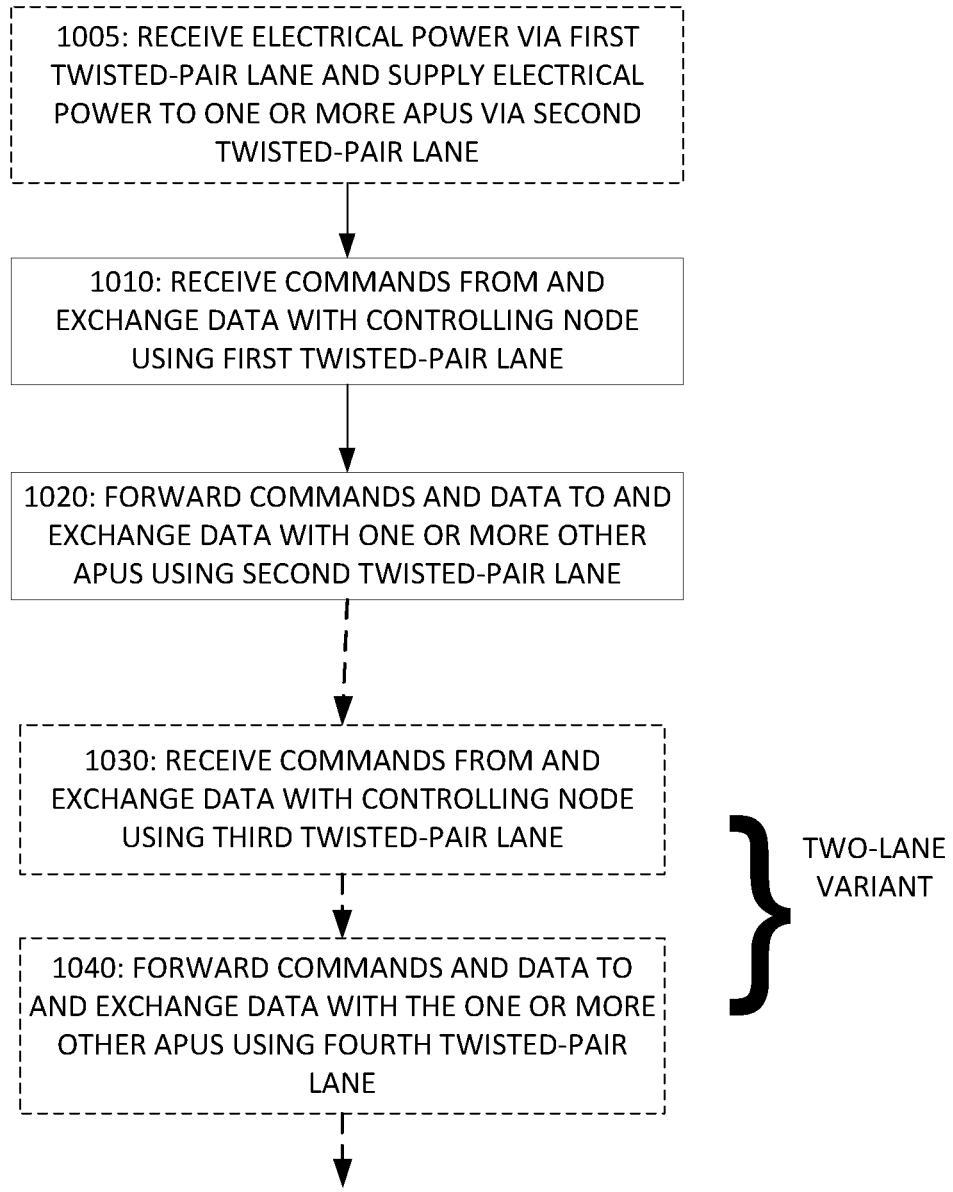
FIG. 10 is a process flow diagram illustrating an example method carried out by an antenna processing node, according to some embodiments.

FIG. 10 illustrates an example method, according to some of the embodiments described herein, as might be implemented in a first antenna processing node of a distributed wireless system that comprises a controlling node, the first antenna processing node, and one or more additional antenna processing nodes, each of the antenna processing nodes being communicatively coupled to the controlling node but spatially separated from each other and from the controlling node. Again, the term "first" as used here does not imply any particular order or placement of the first antenna processing node within the system.

The method of FIG. 10 includes the step of receiving commands from and exchanging data with the controlling node, using a first twisted-pair lane of a physical layer interface having four twisted-pair lanes, as shown at block 1010. The method also includes the step of forwarding commands and data to and receiving data from one or more other ones of the antenna processing nodes, using a second twisted-pair lane of the physical layer interface, as shown at block 1020. It will be appreciated that the first twisted-pair lane here carries communications between the first antenna processing node and the controlling node, i.e., in the upstream direction. However, depending on where this first antenna processing node is in a series of antenna processing nodes, this first twisted-pair lane may be terminated at its other end by another antenna processing node between the first antenna processing and the controlling node, rather than at the controlling node directly. The second twisted-pair lane referred to here, on the other hand, carries communications to and from one or more antenna processing nodes further away from the controlling node, i.e., in the downstream direction.

As discussed above, in some embodiments an antenna processing node may terminate only one twisted-pair lane in each of the upstream and downstream directions. In these embodiments, then, the receiving commands from and exchanging data with the controlling node, as shown at block 1010, is performed using only the first twisted-pair lane. Likewise, the forwarding commands and data to and receiving data from one or more other ones of the antenna processing nodes, as shown at block 1020, is performed using only the second twisted-pair lane. In these embodiments, other twisted-pair lanes in a typical cable supporting four twisted-pair lanes are not used by this antenna processing node, but may be used by other groups of antenna processing nodes in the system.

In these embodiments, i.e., where the antenna processing node terminates only one twisted-pair lane in each of the upstream and downstream directions, the receiving commands from and exchanging data with the controlling node using the first twisted-pair lane may comprise using a first Gigabit Ethernet or 10 Gigabit Ethernet data link layer and using a modified Gigabit Ethernet or 10 Gigabit Ethernet physical layer to map data processed by the first Gigabit Ethernet or 10 Gigabit Ethernet data link layer to and from only the first twisted-pair lane. Likewise, the forwarding commands and data to and receiving data from one or more other ones of the antenna processing nodes may comprise using a second Gigabit Ethernet or 10 Gigabit Ethernet data link layer and using the modified Gigabit Ethernet or 10 Gigabit Ethernet physical layer to map data processed by the second Gigabit Ethernet or 10 Gigabit Ethernet data link layer to and from only the second twisted-pair lane.

In other embodiments, the first antenna processing node may terminate two twisted-pair lanes in each direction. In these embodiments, then, receiving commands from and exchanging data with the controlling node comprises using the first twisted-pair lane and a third twisted-pair lane of the physical layer interface. Similarly, forwarding commands and data to and receiving data from one or more other ones of the antenna processing nodes may comprise using the second twisted-pair lane and a fourth twisted-pair lane of the physical layer interface. The use of these third and fourth twisted-pair lanes is shown in FIG. 10 at blocks 1030 and 1040, which are labeled as the "two-lane alternative."

In these embodiments, the two twisted-pair lanes terminated in a given direction may be mapped to a single Ethernet stack, in a manner similar to but modified from how four twisted-pair lanes are mapped to an Ethernet stack in standard versions of 1000BASE-T or 10GBASE-T, for example. Thus, receiving commands from and exchanging data with the controlling node may comprise using a first Gigabit Ethernet or 10 Gigabit Ethernet data link layer and using a first modified Gigabit Ethernet or 10 Gigabit Ethernet physical layer to map data processed by the first Gigabit Ethernet or 10 Gigabit Ethernet data link layer to and from only the first and third twisted-pair lanes. Likewise, forwarding commands and data to and receiving data from one or more other ones of the antenna processing nodes may comprise using a second Gigabit Ethernet or 10 Gigabit Ethernet data link layer and using a second modified Gigabit Ethernet or 10 Gigabit Ethernet physical layer to map data processed by the second Gigabit Ethernet or 10 Gigabit Ethernet data link layer to and from only the second and fourth twisted-pair lanes.

In any of the embodiments described above, the receiving commands from and exchanging data with the controlling node and said forwarding commands and data to and receiving data from one or more other ones of the antenna processing nodes are performed via a single 8P8C or RJ45 connector interface. In the two-lane alternatives, this would use all 8 pins of the connector, to terminate two lanes in the upstream direction and two lanes in the downstream direction. It will be appreciated, of course, that this will require the use of a split cable attached to the 8-pin connector, to carry the two upstream lanes in one direction while carrying the two downstream lanes in the other. In embodiments of the one-lane alternatives described above, only four pins of the connector are needed to terminate the single lane in the upstream direction and the single lane in the downstream direction.

As discussed above a modified version of Power over Ethernet may be used here. Thus, in some embodiments, the method illustrated in FIG. 10 may comprise receiving electrical power from the controlling node via at least one conductor of the first twisted-pair lane and supplying electrical power to the one or more other ones of the antenna processing nodes via at least one conductor of the second twisted-pair lane. This is shown at block 1005. Note that supplying electrical power to the one or more antenna processing nodes may simply comprise electrically connecting the conductor on which the electrical power is received, from the first twisted-pair lane, to the conductor for supplying power on the second twisted-pair lane. This effectively connects the antenna processing node and downstream antenna processing nodes in parallel, with respect to the power supplied by the controlling node. Generating a new high-voltage power supply on board the antenna processing node, for supplying downstream antenna processing nodes, is not necessary.

Figure 11:
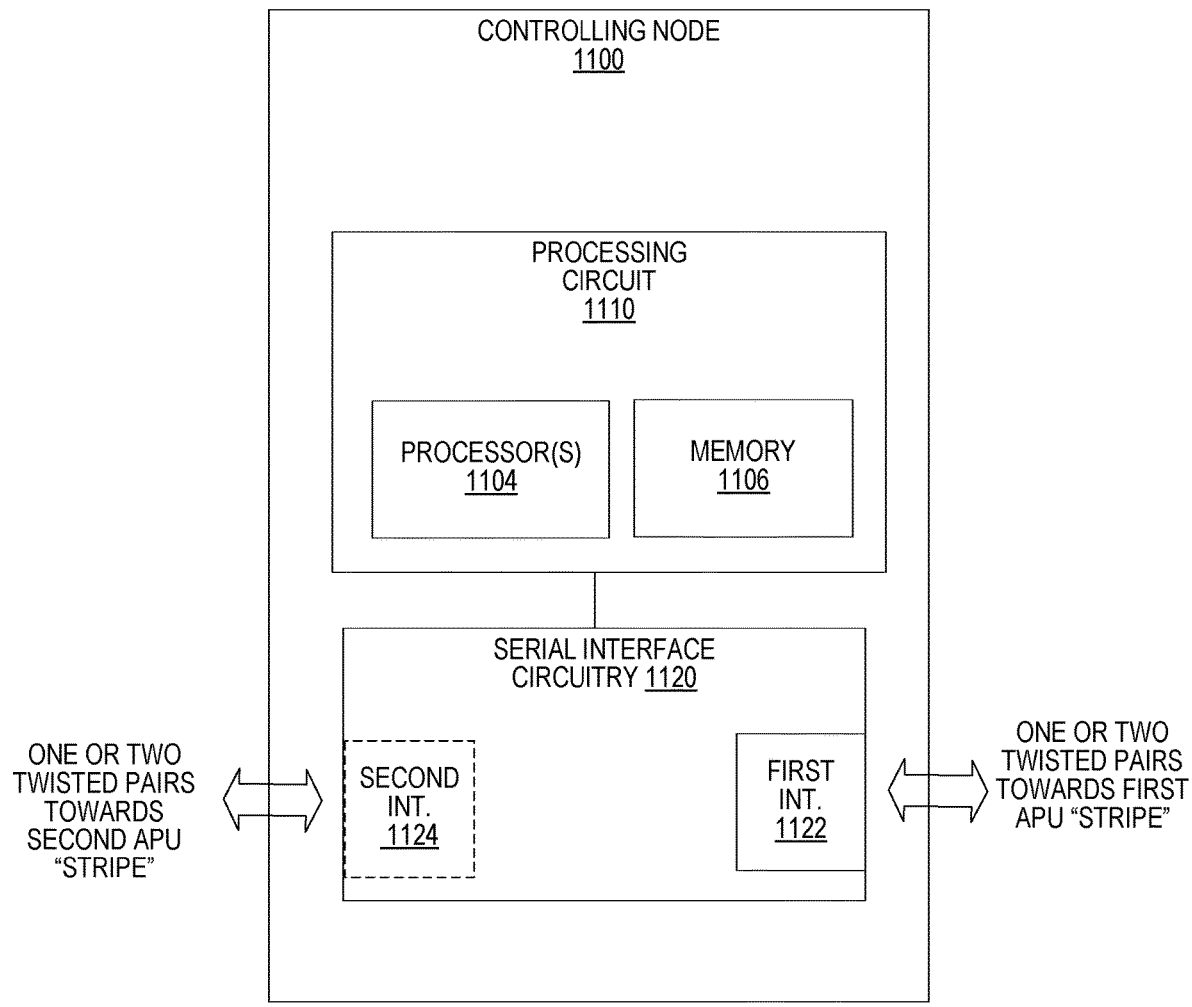
FIG. 11 is a block diagram of an example controlling node, according to some embodiments.

FIG. 11 is a block diagram illustrating an example controlling node 1100, according to some embodiments. Controlling node 1100 includes a processing circuit 1110, which in turn includes one or more processors 1104, controllers, or the like, coupled to memory 1106, which may comprise one or several types of memory, such as random-access memory, read-only memory, flash memory, etc. Stored in memory 1106 may be computer program code for execution by processor(s) 1104, including program code configured to cause the controlling node 1100 to carry out any one or more of the techniques described herein, such as the methods discussed above in connection with FIGS. 8 and 10.

Controlling node 1100 further comprises serial interface circuitry 1120 operatively coupled to the processing circuit 1110. Serial interface circuitry 1120 includes a first serial interface 1122 configured to transmit data to and receive data from one or several antenna processing nodes connected in series, via a serial link connected to the serial interface 1122. The one or several antenna processing nodes connected via this first serial interface 1122 may be considered to be a first stripe, branch, or chain. Serial interface circuitry 1120 also comprises a second serial interface 1124, configured to transmit data to and receive data from a second set of antenna processing nodes connected in series, via a serial link connected to the second serial interface 1124. These antenna processing nodes may be considered to be a second stripe, branch, or chain. Thus, the controlling node 1100 may be able to separately control two (or more) stripes, branches, or chains of antenna processing nodes, through respective serial interfaces.

More particularly, it will be appreciated that serial interface circuitry 1120 is (a) configured to communicate with a first subset of antenna processing nodes using only one or two twisted-pair lanes while communicating with a second subset of antenna processing nodes using another one or two twisted-pair lanes, e.g., in accordance with the method illustrated in FIG. 9, and variants thereof.

While not shown in FIG. 11, in some embodiments the controlling node 1100 may be collocated with or include an antenna processing node or comparable functionality, e.g., as shown in FIG. 4. From a functional standpoint, this collocated antenna processing node functionality may be treated in the same manner as other antenna processing nodes in a series.

Referring again to FIG. 4, this figure is a block diagram illustrating an example antenna processing node 400, according to some embodiments. Antenna processing node 400 includes radio circuitry 410 and antennas 415, processing circuit 420, and serial interface circuitry 430, which includes a first serial interface 432, initially facing "upstream" towards a controlling node, as well as a second serial interface 434, initially facing "downstream," towards one or more subsequent antenna processing nodes. According to various embodiments as disclosed herein, the upstream interface may terminate only one or two twisted-pair lanes and the downstream interface may likewise terminate only one or two twisted-pair lanes, e.g., according to the methods illustrated in FIG. 10, and variants thereof.

Radio circuitry 410 includes receive (RX) and transmit (TX) functionality for communicating with one or more wireless devices via antennas 415. For downlink communications, i.e., radio communications to one or more wireless devices, the radio circuitry 410 includes TX circuitry 414 configured to receive baseband information relayed to the radio circuitry 410 from a controlling node, via the upstream serial interface 432 and the processing circuit 420. TX circuitry 414 includes upconverter circuits, power amplifier circuits, and filter circuits to convert this baseband information to radio frequency and condition it for transmission to one or more wireless devices. For uplink communications, i.e., radio communications from one or more wireless devices, the radio circuitry 410 includes RX circuitry 412 configured to receive wireless transmissions via antennas 415, amplify, filter, and downconvert the received transmissions, and sample the downconverted transmissions to obtain soft information corresponding to the received wireless transmission. This soft information may be in the form of I-Q samples, for instance, and may be interchangeably referred to as soft bits or soft bit information. The soft bit information is passed to processing circuit 420, for processing and further handling, which may include sending the soft bit information to the controlling node.

Processing circuit 420 includes one or more processors 424, controllers, or the like, coupled to memory 426, which may comprise one or several types of memory, such as random-access memory, read-only memory, flash memory, etc. Stored in memory 426 may be computer program code for execution by processor(s) 424, including program code configured to control the radio circuitry 410 and serial interface circuitry 430 and to cause the antenna processing node 400 to carry out any one or more of the techniques described herein, such as the methods discussed above in connection with FIG. 10.

Further embodiments comprise distributed wireless systems comprising one or more controlling nodes like those described above as well as one or more antenna processing nodes. These distributed wireless systems may be deployed in any of a wide variety of configurations. The controlling node(s) in such a distributed wireless system may utilize any of the techniques described herein, e.g., as shown in FIG. 9, while the antenna processing nodes in the system utilize any one or more of the techniques illustrated in FIG. 10, for example.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method, in a controlling node of a distributed wireless system that comprises the controlling node and two or more antenna processing nodes communicatively coupled to the controlling node but spatially separated from each other and from the controlling node, the method comprising:
   sending commands to and exchanging data with a first subset of the antenna processing nodes, using a first twisted-pair lane of a physical layer interface having four twisted-pair lanes;
   sending commands to and exchanging data with a second subset of the antenna processing nodes, using a second twisted-pair lane of the physical layer interface;
   sending commands to and exchanging data with a third subset of the antenna processing nodes, using a third twisted-pair lane of the physical layer interface; and
   sending commands to and exchanging data with a fourth subset of the antenna processing nodes, using a fourth twisted-pair lane of the physical layer interface.

2. The method of claim 1, wherein:
   sending commands to and exchanging data with the first subset of the antenna processing nodes comprises using a first Gigabit Ethernet or 10 Gigabit Ethernet data link layer and using a modified Gigabit Ethernet or 10 Gigabit Ethernet physical layer to map data processed by the first Gigabit Ethernet or 10 Gigabit Ethernet data link layer to and from only the first twisted-pair lane; and sending commands to and exchanging data with the second subset of the antenna processing nodes comprises using a second Gigabit Ethernet or 10 Gigabit Ethernet data link layer and using the modified Gigabit Ethernet or 10 Gigabit Ethernet physical layer to map data processed by the second Gigabit Ethernet or 10 Gigabit Ethernet data link layer to and from only the second twisted-pair lane.

3. The method of claim 1, wherein:

sending commands to and exchanging data with the first subset of the antenna processing nodes comprises using the first twisted-pair lane and a third twisted-pair lane of the physical layer interface; and sending commands to and exchanging data with the second subset of the antenna processing nodes comprises using the second twisted-pair lane and a fourth twisted-pair lane of the physical layer interface.

4. The method of claim 3, wherein:

sending commands to and exchanging data with the first subset of the antenna processing nodes comprises using a first Gigabit Ethernet or 10 Gigabit Ethernet data link layer and using a first modified Gigabit Ethernet or 10 Gigabit Ethernet physical layer to map data processed by the first Gigabit Ethernet or 10 Gigabit Ethernet data link layer to and from only the first and third twisted-pair lanes; and sending commands to and exchanging data with the second subset of the antenna processing nodes comprises using a second Gigabit Ethernet or 10 Gigabit Ethernet data link layer and using a second modified Gigabit Ethernet or 10 Gigabit Ethernet physical layer to map data processed by the second Gigabit Ethernet or 10 Gigabit Ethernet data link layer to and from only the third and fourth twisted-pair lanes.

5. The method of claim 1, wherein the method comprises:

determining that communications with a first antenna processing node have failed, the first antenna processing node being in the first subset and having been used by the controlling node to communicate with a first user equipment; and, in response to said determining, shifting communications with the first user equipment to at least a second antenna processing node, in the second subset.

6. The method of claim 1, wherein the method comprises supplying electrical power to the first subset of antenna processing nodes via at least one conductor of the first twisted-pair lane and supplying electrical power to the second subset of antenna processing nodes via at least one conductor of the second twisted-pair lane.

7. A method, in a first antenna processing node of a distributed wireless system that comprises a controlling node, the first antenna processing node, and one or more additional antenna processing nodes, each of the antenna processing nodes being communicatively coupled to the controlling node but spatially separated from each other and from the controlling node, the method comprising:

receiving commands from and exchanging data with the controlling node, using a first twisted-pair lane of a physical layer interface having four twisted-pair lanes; and forwarding commands and data to and receiving data from one or more other ones of the antenna processing nodes, using a second twisted-pair lane of the physical layer interface.

8. The method of claim 7, wherein the method comprises:

receiving commands from and exchanging data with the controlling node using only the first twisted-pair lane; and forwarding commands and data to and receiving data from one or more other ones of the antenna processing nodes using only the second twisted-pair lane.

9. The method of claim 8, wherein:

receiving commands from and exchanging data with the controlling node using the first twisted-pair lane comprises using a first Gigabit Ethernet or 10 Gigabit Ethernet data link layer and using a modified Gigabit Ethernet or 10 Gigabit Ethernet physical layer to map data processed by the first Gigabit Ethernet or 10 Gigabit Ethernet data link layer to and from only the first twisted-pair lane; and forwarding commands and data to and receiving data from one or more other ones of the antenna processing nodes comprises using a second Gigabit Ethernet or 10 Gigabit Ethernet data link layer and using the modified Gigabit Ethernet or 10 Gigabit Ethernet physical layer to map data processed by the second Gigabit Ethernet or 10 Gigabit Ethernet data link layer to and from only the second twisted-pair lane.

10. The method of claim 7, wherein:

receiving commands from and exchanging data with the controlling node comprises using the first twisted-pair lane and a third twisted-pair lane of the physical layer interface; and forwarding commands and data to and receiving data from one or more other ones of the antenna processing nodes comprises using the second twisted-pair lane and a fourth twisted-pair lane of the physical layer interface.

11. The method of claim 10, wherein:

receiving commands from and exchanging data with the controlling node comprises using a first Gigabit Ethernet or 10 Gigabit Ethernet data link layer and using a first modified Gigabit Ethernet or 10 Gigabit Ethernet physical layer to map data processed by the first Gigabit Ethernet or 10 Gigabit Ethernet data link layer to and from only the first and third twisted-pair lanes; and forwarding commands and data to and receiving data from one or more other ones of the antenna processing nodes comprises using a second Gigabit Ethernet or 10 Gigabit Ethernet data link layer and using a second modified Gigabit Ethernet or 10 Gigabit Ethernet physical layer to map data processed by the second Gigabit Ethernet or 10 Gigabit Ethernet data link layer to and from only the second and fourth twisted-pair lanes.

12. A distributed wireless system comprising:

a controlling node; and two or more antenna processing nodes communicatively coupled to the controlling node but spatially separated from each other and from the controlling node;

the controlling node being configured to:

send commands to and exchange data with a first subset of the antenna processing nodes, using a first twisted-pair lane of a physical layer interface having four twisted-pair lanes, and is further configured to send commands to and exchange data with a second subset of the antenna processing nodes, using a second twisted-pair lane of the physical layer interface, the first subset including every second one of the antenna processing nodes, as ordered along cabling connecting the controlling node to the antenna processing nodes, the second subset including the remaining ones of the antenna processing nodes;

send commands to and exchange data with the first subset of the antenna processing nodes using the first twisted pair lane and a third twisted-pair lane of the physical layer interface; and send commands to and exchange data with the second subset of the antenna processing nodes using the second twisted-pair lane and a fourth twisted-pair lane of the physical layer interface.

13. The distributed wireless system of claim 12, wherein the controlling node is configured to:

determine that communications with a first antenna processing node have failed, the first antenna processing node being in the first subset and having been used by the controlling node to communicate with a first user equipment; and, in response to said determining, shift communications with the first user equipment to at least a second antenna processing node, in the second subset.

14. A first antenna processing node for use in a distributed wireless system that comprises at least one controlling node and two or more antenna processing nodes, including the first antenna processing node, communicatively coupled to the controlling node but spatially separated from each other and from the controlling node, wherein the first antenna processing node comprises:

radio circuitry configured for radio communication with one or more wireless devices;

serial interface circuitry, wherein the serial interface circuitry is (a) configured to communicate with a controlling node using a first twisted-pair lane of a physical layer interface having four twisted-pair lanes, and (b) communicate with at least a second antenna processing node using a second twisted-pair lane of the physical layer interface; and a processing circuit operatively coupled to the radio circuitry and to the serial interface circuitry, wherein the processing circuit is configured to receive commands from and exchange data with the controlling node, using the first twisted-pair lane, and forward commands and data to and receive data from one or more other ones of the antenna processing nodes, using the second twisted-pair lane.

15. The first antenna processing node of claim 14, wherein the processing circuit is configured to:

receive commands from and exchange data with the controlling node using only the first twisted-pair lane; and forward commands and data to and receive data from one or more other ones of the antenna processing nodes using only the second twisted-pair lane.

16. The first antenna processing node of claim 15, wherein the processing circuit is configured to:

receive commands from and exchange data with the controlling node using the first twisted-pair lane using a first Gigabit Ethernet or 10 Gigabit Ethernet data link layer and using a modified Gigabit Ethernet or 10 Gigabit Ethernet physical layer to map data processed by the first Gigabit Ethernet or 10 Gigabit Ethernet data link layer to and from only the first twisted-pair lane; and forward commands and data to and receive data from one or more other ones of the antenna processing nodes using a second Gigabit Ethernet or 10 Gigabit Ethernet data link layer and using the modified Gigabit Ethernet or 10 Gigabit Ethernet physical layer to map data processed by the second Gigabit Ethernet or 10 Gigabit Ethernet data link layer to and from only the second twisted-pair lane.

17. The first antenna processing node of claim 14, wherein the processing circuit is configured to:

receive commands from and exchange data with the controlling node using the first twisted-pair lane and a third twisted-pair lane of the physical layer interface; and forward commands and data to and receive data from one or more other ones of the antenna processing nodes using the second twisted-pair lane and a fourth twisted-pair lane of the physical layer interface.

* * * * *